(12) United States Patent
Huang et al.

(10) Patent No.: US 12,484,452 B2
(45) Date of Patent: Nov. 25, 2025

(54) METHOD OF FABRICATING MAGNETIC TUNNELING JUNCTION DEVICE

(71) Applicant: United Microelectronics Corp., Hsinchu (TW)

(72) Inventors: Shun-Yu Huang, Kaohsiung (TW); Yi-Wei Tseng, New Taipei (TW); Chih-Wei Kuo, Tainan (TW); Yi-Xiang Chen, Tainan (TW); Hsuan-Hsu Chen, Tainan (TW); Chun-Lung Chen, Tainan (TW)

(73) Assignee: United Microelectronics Corp., Hsinchu (TW)

( * ) Notice: Subject to any disclaimer, the term of this patent is extended or adjusted under 35 U.S.C. 154(b) by 676 days.

(21) Appl. No.: 17/874,327

(22) Filed: Jul. 27, 2022

(65) Prior Publication Data

US 2024/0016062 A1 Jan. 11, 2024

(30) Foreign Application Priority Data

Jul. 6, 2022 (TW) .................................. 111125330

(51) Int. Cl.
| | |
|---|---|
| *H10N 50/01* | (2023.01) |
| *H10B 61/00* | (2023.01) |
| *H10N 50/10* | (2023.01) |
| *H10N 50/80* | (2023.01) |
| *G11C 11/16* | (2006.01) |

(52) U.S. Cl.
CPC ............. *H10N 50/01* (2023.02); *H10B 61/00* (2023.02); *H10B 61/22* (2023.02); *H10N 50/10* (2023.02); *H10N 50/80* (2023.02); *G11C 11/161* (2013.01)

(58) Field of Classification Search
CPC ........ H10N 50/01; H10N 50/10; H10N 50/80; H10B 61/00; H10B 61/22; G11C 11/161
See application file for complete search history.

(56) References Cited

U.S. PATENT DOCUMENTS

| | | | | |
|---|---|---|---|---|
| 9,472,753 | B1 | 10/2016 | Katine | |
| 9,515,250 | B2* | 12/2016 | Ha | H10N 50/80 |
| 9,705,071 | B2* | 7/2017 | Annunziata | H10N 50/80 |
| 2014/0042567 | A1* | 2/2014 | Jung | H10N 50/10 |
| | | | | 257/E43.001 |
| 2015/0340593 | A1* | 11/2015 | Lu | H10N 50/80 |
| | | | | 257/421 |
| 2017/0069834 | A1* | 3/2017 | Annapragada | H10N 35/01 |
| 2018/0033957 | A1* | 2/2018 | Zhang | H10N 50/01 |

(Continued)

*Primary Examiner* — Christine S. Kim
*Assistant Examiner* — Tien Tran
(74) *Attorney, Agent, or Firm* — JCIPRNET

(57) ABSTRACT

A method of fabricating an MTJ device is provided including the following process. A first via is formed in the first dielectric layer. A first electrode layer is formed on the first dielectric layer and the first via. An MTJ stack layer is formed on the first electrode layer. A patterned second electrode layer is formed on the MTJ stack layer and used as a mask. A first ion beam etching process is performed to etch the patterned second electrode layer and pattern the MTJ stack layer and the first electrode layer to form a second electrode, an MTJ stack structure, and a first electrode. A first protective layer is formed to cover the second electrode and the MTJ stack structure. A second ion beam etching process is performed to remove a portion of the MTJ stack structure and a portion of the first electrode.

11 Claims, 5 Drawing Sheets

(56) References Cited

U.S. PATENT DOCUMENTS

| | | | |
|---|---|---|---|
| 2021/0074907 A1* | 3/2021 | Wang | H10N 50/80 |
| 2021/0151502 A1* | 5/2021 | Kim | G11C 11/161 |
| 2021/0175412 A1* | 6/2021 | Chern | H10N 50/85 |
| 2022/0131070 A1* | 4/2022 | Lin | H10N 50/01 |
| 2023/0165156 A1* | 5/2023 | Dutta | H10N 50/01 |
| | | | 365/158 |

* cited by examiner

METHOD OF FABRICATING MAGNETIC TUNNELING JUNCTION DEVICE

CROSS-REFERENCE TO RELATED APPLICATION

This application claims the priority benefit of Taiwan application serial no. 111125330, filed on Jul. 6, 2022. The entirety of the above-mentioned patent applications is hereby incorporated by reference herein and made a part of this specification.

BACKGROUND

Technical Field

The disclosure relates to a method of fabricating a semiconductor device, and in particular relates to a method of fabricating a magnetic tunneling junction (MTJ) device.

Description of Related Art

The magnetoresistance (MR) effect is the effect that the resistance of the material changes with the change of the external magnetic field. The definition of its physical quantity is the resistance difference in the presence or absence of the magnetic field divided by the original resistance, which is used to represent the resistance change rate. At present, the magnetoresistance effect has been successfully used in the production of hard disks and has important commercial application value. In addition, magnetic random access memory (MRAM) may also be made by using the characteristics of giant magnetoresistive materials with different resistance values in different magnetization states, which has the advantage of continuing to retain stored data without electricity.

The above-mentioned magnetoresistive effect is also applied in the field of magnetic field sensor, for example, an electronic compass component equipped with a global positioning system (GPS) in a mobile phone is used to provide information such as the moving position of the user. At present, there are various magnetic field sensor technologies on the market, such as anisotropic magnetoresistance (AMR) sensing devices, giant magnetoresistance (GMR) sensing devices, magnetic tunneling junction (MTJ) sensing devices, etc. However, the disadvantages of the above-mentioned prior art generally include: occupying a larger wafer area, more expensive manufacturing process, higher power consumption, insufficient sensitivity, and being susceptible to temperature changes, etc., and further improvements are necessary.

SUMMARY

A method of fabricating a magnetic tunneling junction (MTJ) device according to an embodiment of the disclosure may avoid abnormal connections between MTJ device units and reduce the wafer area occupied by the MTJ device.

A method of fabricating an MTJ device according to an embodiment of the disclosure includes the following process. A first via is formed in a first dielectric layer. A first electrode layer is formed on the first dielectric layer and the first via. An MTJ stack layer is formed on the first electrode layer. A patterned second electrode layer is formed on the MTJ stack layer. Using the patterned second electrode layer as a mask, a first ion beam etching process is performed to etch the patterned second electrode layer and pattern the MTJ stack layer and the first electrode layer to form a second electrode, an MTJ stack structure, and a first electrode. A first protective layer is formed to cover a top surface and a sidewall of the second electrode and a sidewall of the MTJ stack structure. Using the protective layer as a mask, a second ion beam etching process is performed to remove at least a portion of the MTJ stack structure and at least a portion of the first electrode.

Based on the above, the MTJ device of the embodiment of the disclosure utilizes two ion beam etching processes and a protective layer with overhang formed between the two ion beam etching processes, so that the MTJ device may have the required profile and size, avoid abnormal connection between the MTJ device units, improve the reliability of the device, increase the accuracy of reading and writing, reduce the spacing between the MTJ devices, and reduce the wafer area occupied by the MTJ devices.

DETAILED DESCRIPTION OF DISCLOSED EMBODIMENTS

FIG. 1A to FIG. 1H are cross-sectional schematic views of a method of fabricating an MTJ device according to an embodiment of the disclosure.

Figure 1A:
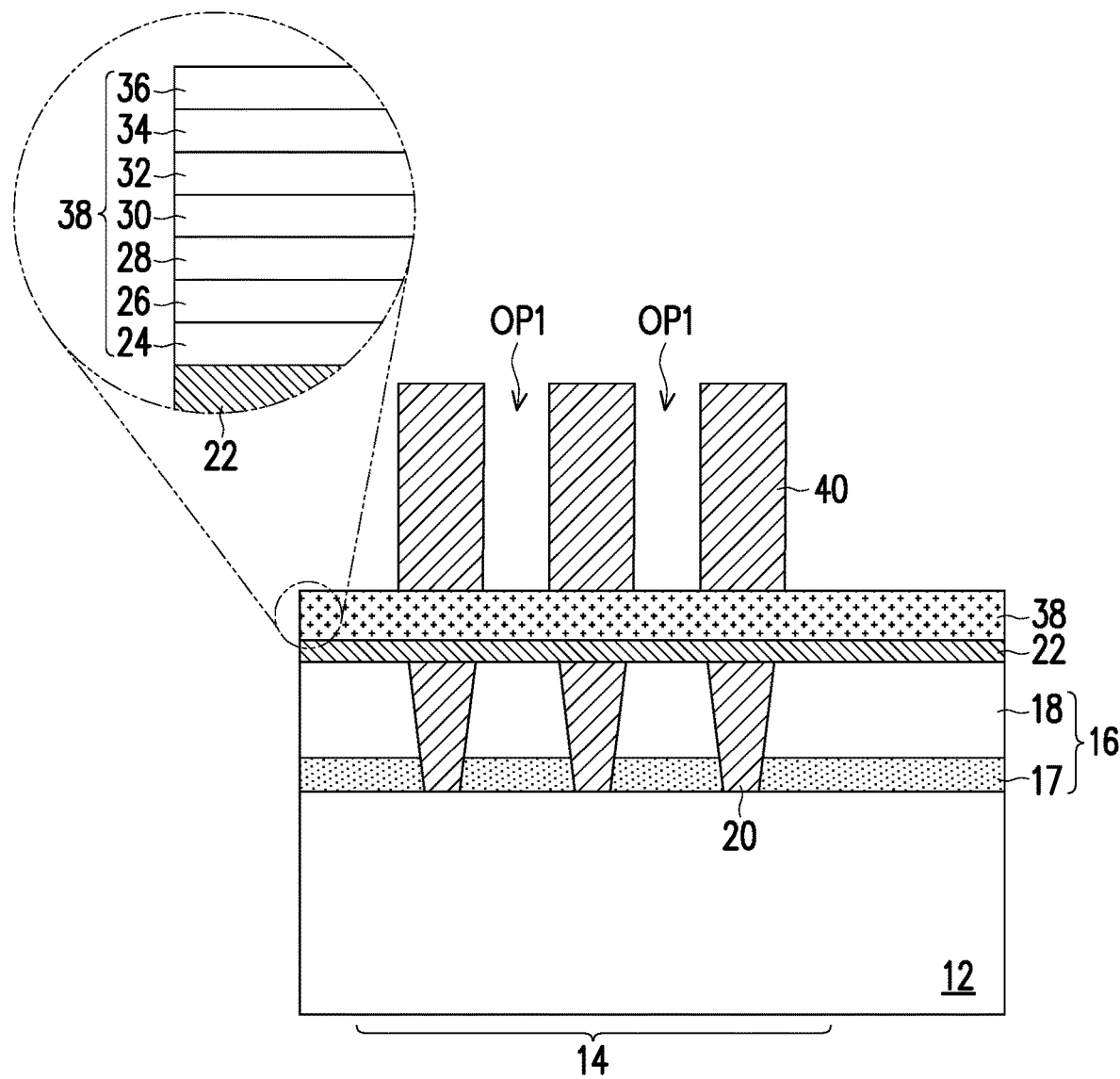
FIG. 1A to FIG. 1H are cross-sectional schematic views of a method of fabricating an MTJ device according to an embodiment of the disclosure.

Referring to FIG. 1A, a substrate 12 is provided, such as a substrate 12 including a semiconductor material, the semiconductor material may be selected from the group including silicon, germanium, silicon-germanium compound, silicon carbide, gallium arsenide, etc., and the substrate 12 preferably defines a magnetic tunneling junction region (MTJ) 14 and a logic region (not shown).

The substrate 12 may include active devices such as metal oxide semiconductor (MOS) transistors, passive devices, conductive layers, and dielectric layers such as interlayer dielectric (ILD) layers covering thereon. More specifically, the substrate 12 may include MOS transistor elements such as planar or non-planar (e.g., fin structure transistors). The MOS transistor may include a gate structure (such as a metal gate) and transistor elements such as source/drain regions, spacer walls, epitaxial layers, and contact hole etch stop layers. The interlayer dielectric layer may be disposed on the substrate 12 and cover the MOS transistor, and the interlayer dielectric layer may have multiple contact plugs to electrically connect the gate and/or source/drain regions of the MOS transistor. Since the related processes such as planar or non-planar transistors and interlayer dielectric layers are well known in the art, they are not described in detail herein.

Then, a metal interconnect structure 16 is sequentially formed on the interlayer dielectric layer of the MTJ region 14 and the logic region to electrically connect the aforementioned contact plugs. The metal interconnect structure 16 includes a dielectric layer 18 and metal interconnects 20 embedded in the dielectric layer 18. The dielectric layer 18 is also referred to as an interlayer dielectric layer. The dielectric layer 18 includes an insulating material such as silicon oxide. In some embodiments, the metal interconnect structure 16 further includes an etch stop layer 17. The material of the etch stop layer 17 includes silicon nitride and silicon oxynitride.

In this embodiment, each of the metal interconnects 20 in the metal interconnect structure 16 may include vias, conductive lines, or a combination thereof. Each of the metal interconnects 20 may be embedded in the dielectric layer 18 according to a single damascene process or a dual damascene process and are electrically connected to each other. For example, each of the metal interconnects 20 may include a barrier layer (or referred to as an adhesive layer) and a metal layer. A barrier layer (or an adhesive layer) is interposed between the dielectric layer 18 and the metal layer. The barrier layer may be selected from a group including titanium (Ti), titanium nitride (TiN), tantalum (Ta) and tantalum nitride (TaN), and the metal layer may be selected from a group including tungsten (W), copper (Cu), aluminum (Al), titanium aluminum alloy (TiAl), cobalt tungsten phosphide (CoWP), etc., but not limited thereto. Since the single damascene or dual damascene process is a well-known technique in the art, it is not repeated herein. In one example, the dielectric layer 18 includes silicon oxide, the metal layer of the metal interconnect 20 includes tungsten, and the adhesion layer of the metal interconnect 20 includes tungsten nitride, but not limited thereto.

Next, a first electrode layer 22 is first formed on the surface of the dielectric layer 18. In some embodiments, the material of the first electrode layer 22 includes a conductive material, such as titanium (Ti), tantalum (Ta), platinum (Pt), copper (Cu), gold (Au), aluminum (Al), titanium nitride (TiN), or a combination thereof, but not limited thereto.

After that, an MTJ stack layer 38 is formed on the first electrode layer 22. In some embodiments, the MTJ stack layer 38 includes a pinned layer 24, a reference layer 26, a barrier layer 28, and a free layer 30. The material of the pinned layer 24 may include antiferromagnetic (AFM) materials, such as iron manganese (FeMn), platinum manganese (PtMn), iridium manganese (IrMn), nickel oxide (NiO), etc., to fix or confine the magnetic moment direction of adjacent layers. The reference layer 26 is formed between the pinned layer 24 and the barrier layer 28, and its material includes a ferromagnetic material such as iron, cobalt, nickel, or alloys thereof, such as cobalt iron boron (CoFeB), but is not limited thereto. The material of the barrier layer 28 may include oxide insulating materials, such as aluminum oxide (AlOx) or magnesium oxide (MgO), but not limited thereto. The magnetization direction of the free layer 30 is "free" to be changed by an external magnetic field. The material of the free layer 30 includes a ferromagnetic material, such as iron, cobalt, nickel, or alloys thereof, such as cobalt iron boron (CoFeB), but not limited thereto. The free layer 30 may be a single layer or multiple layers. In some embodiments, the free layer 30 includes a first free layer 32 and a second free layer 36. In addition, a stop layer 34 is between the first free layer 32 and the second free layer 36 for separation. The stop layer 34 is, for example, tantalum.

Multiple patterned second electrode layers 40 are formed on the MTJ stack layer 38, and multiple openings OP1 are formed therebetween. The material of the patterned second electrode layer 40 includes includes a conductive material, such as titanium (Ti), tantalum (Ta), platinum (Pt), copper (Cu), gold (Au), aluminum (Al), titanium nitride (TiN), or a combination thereof, but not limited thereto. In some embodiments, the first electrode layer 22 includes a titanium/titanium nitride composite layer, and the patterned second electrode layer 40 includes titanium nitride. The formation method of the patterned second electrode layer 40 is, for example, forming a second electrode layer (not shown) on the MTJ stack layer 38. Then, a patterning process is performed. During the patterning process, a hard mask layer, such as silicon oxide or silicon nitride, may be first formed on the second electrode layer, and then the hard mask layer is patterned through a lithography and etching process. Using the patterned hard mask layer as an etching mask, the second electrode layer is patterned, and then the patterned hard mask layer is removed.

Figure 1B:
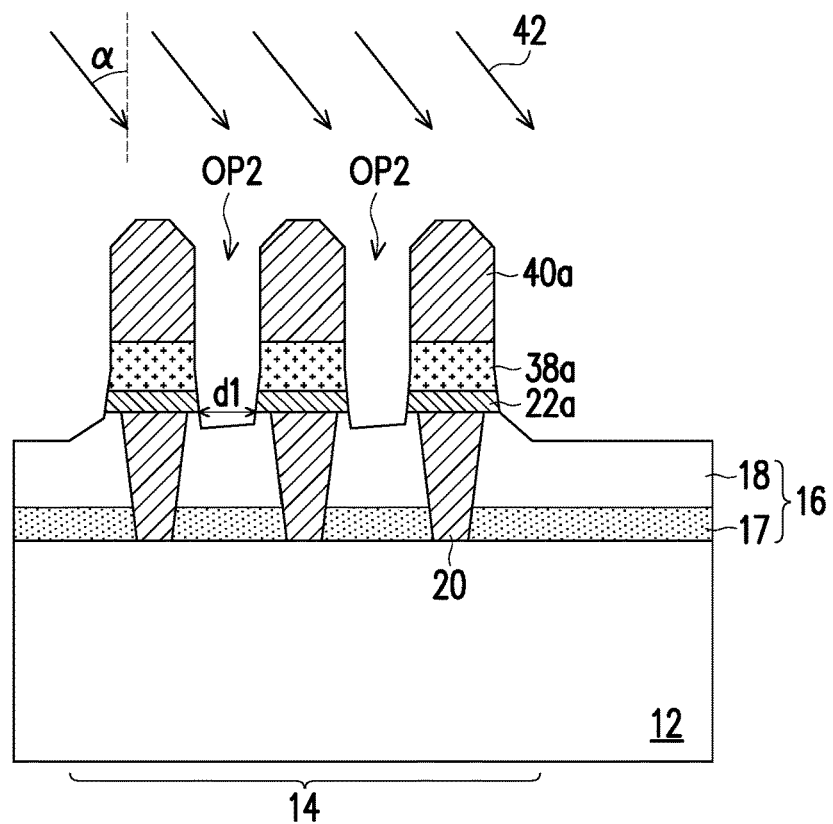

Referring to FIG. 1B, using multiple patterned second electrode layers 40 as masks, a first ion beam etching process 42 is performed to pattern the MTJ stack layer 38 and the first electrode layer 22 to form multiple MTJ stack structures 38a and multiple first electrodes 22a, and multiple openings OP2 exposing the dielectric layer 18 are formed therebetween. During the first ion beam etching process 42, the patterned second electrode layer 40 is also etched to form multiple second electrodes 40a. The first ion beam etching process 42 may initially define the sizes of the second electrodes 40a, the MTJ stack structures 38a, and the first electrodes 22a.

The first ion beam etching process 42 is, for example, a reactive ion etching process. The gas used in the first ion beam etching process 42 includes noble gas, such as argon gas. The included angle α (or referred to as the inclination angle) between the implantation direction of the ion beam in the first ion beam etching process 42 and the surface of the substrate 12 is, for example, 10 degrees to 30 degrees. The energy of the first ion beam etching process 42 is, for example, 1500V to 10000V, and the time is, for example, 30 seconds to 80 seconds.

During the first ion beam etching process 42, the top corners of the patterned second electrode layer 40 are chamfered, so that the top corners of the formed second electrode 40a have obtuse or rounded corners. In addition, in some embodiments, the width of the formed MTJ stack structure 38a and the first electrode 22a is larger as the MTJ stack structure 38a and the first electrode 22a are closer to the substrate 12 due to the difference in the etching rate. That is, both the MTJ stack structure 38a and the first electrode 22a have a shape with a lower width greater than an upper width. At this stage, a minimum distance d1 between the lower widths of the adjacent first electrodes 22a is relatively small, and after the subsequent second ion beam etching process 46 is performed, a minimum distance d2 between the lower widths of the adjacent first electrodes 22b becomes larger, that is, d2>d1.

Figure 1C:
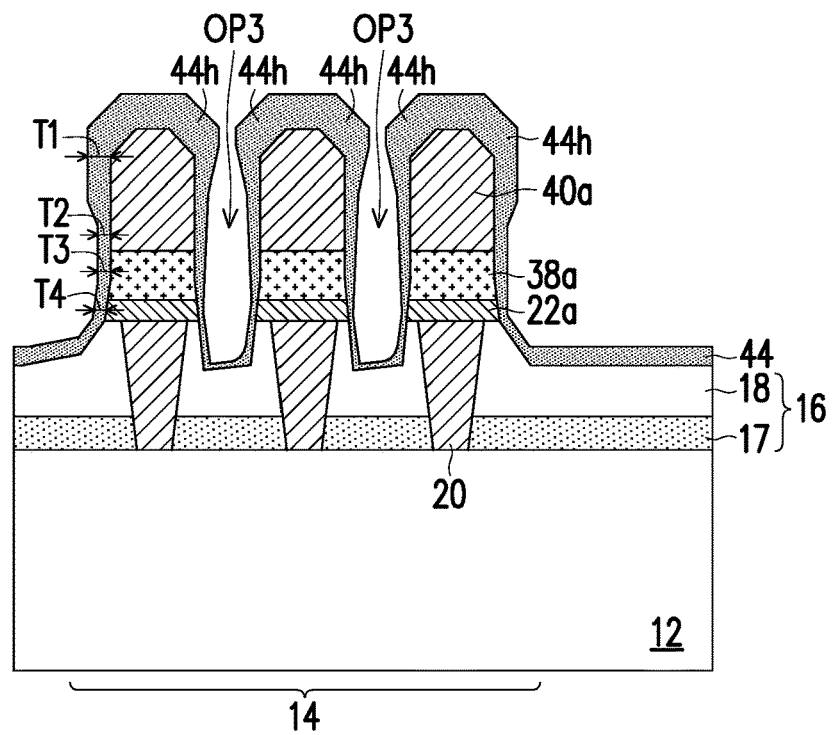

Next, referring to FIG. 1C, a first protective layer 44 is formed over the substrate 12 and multiple openings OP3 are formed therebetween. In some embodiments, the first protective layer 44 covers at least the top surface and the sidewall of the second electrode 40a and the sidewall of the MTJ stack structure 38a. In other embodiments, the first protective layer 44 covers the top surface and the sidewall of the second electrode 40a, the sidewall of the MTJ stack structure 38a, and the sidewall of the first electrode 22a. In some embodiments, the first protective layer 44 is formed to have a thickness T1 at the top corner and the upper sidewall of the second electrode 40a greater than a thickness T2 at the lower sidewall of the second electrode 40a. The first protective layer 44 is formed to have a thickness T2 at the lower sidewall of the second electrode 40a greater than an average thickness T3 at the sidewall of the MTJ stack structure 38a. The first protective layer 44 is formed to have a thickness T2 at the lower sidewall of the second electrode 40a greater than an average thickness T4 at the sidewall of the first electrode 22a. In other embodiments, the first protective layer 44 is formed to have overhangs 44h, and the closer to the substrate 12, the smaller the thickness of the first protective layer 44 is. That is, the material of the first protective layer 44 includes a dielectric material, such as silicon nitride, silicon oxide, silicon oxynitride (SiON), silicon carbon oxynitride (SiCON), silicon carbide (SiC), or a combination thereof. The formation method of the first protective layer 44 is, for example, chemical vapor deposition (CVD) or atomic layer deposition (ALD). The first protective layer 44 may be a single layer or multiple layers. The thickness of the first protective layer 44 must be sufficient to protect the top surface, the corners, and the sidewall of the second electrode 40*a* in the subsequent second ion beam etching process 46 to prevent the second electrode 40*a* from being damaged by etching, so that the second electrode 40*a* may maintain the existing size, shape, and profile.

Figure 1D:
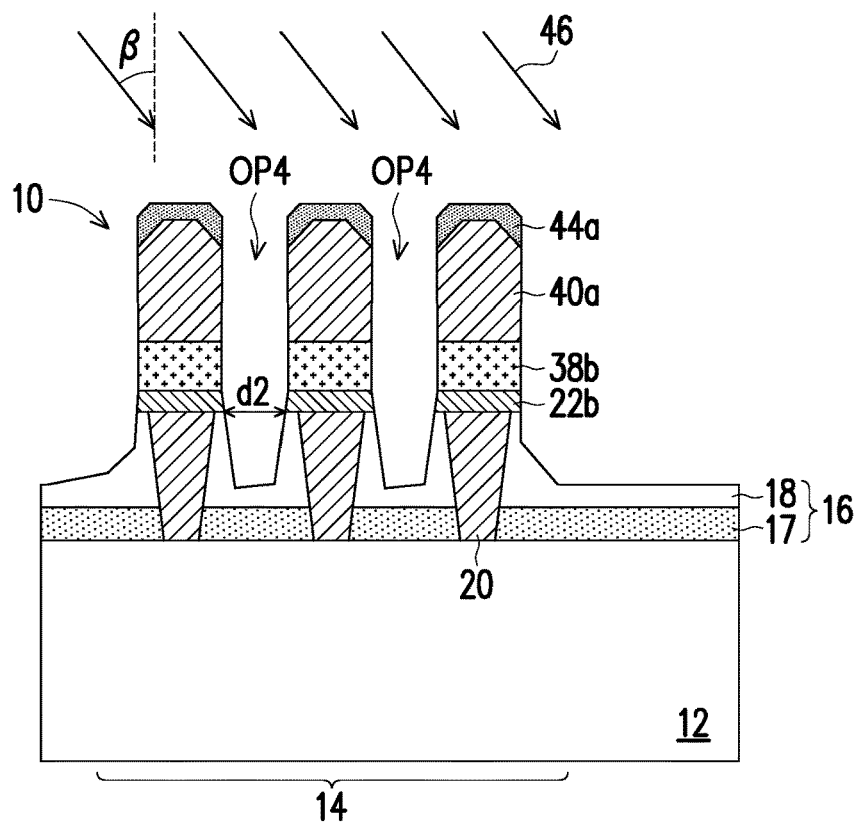

Referring to FIG. 1D, as a mask, a second ion beam etching process 46 is performed to remove a portion of the MTJ stack structures 38*a* and the first electrodes 22*a* to form multiple MTJ stack structures 38*b* and multiple first electrodes 22*b*, and multiple openings OP4 are formed therebetween. Performing the second ion beam etching process 46 may finely trim the MTJ stack structures 38*a* and the first electrodes 22*a* so that the formed MTJ stack structures 38*b* and the first electrodes 22*b* have desired profiles. Thereby the MTJ stack structures 38*b* and the first electrodes 22*b* have a required distance between each other, so as to avoid abnormal electrical connections between the adjacent MTJ stack structures 38*b* and the adjacent first electrodes 22*b*.

The second ion beam etching process 46 is, for example, a reactive ion etching process. The gas used in the second ion beam etching process 46 includes noble gas, such as argon gas. The included angle β (or referred to as the inclination angle) between the implantation direction of the ion beam in the second ion beam etching process 46 and the surface of the substrate 12 is, for example, 10 degrees to 30 degrees. The energy of the second ion beam etching process 46 is, for example, 1500V to 10000V, and the time is, for example, 30 seconds to 80 seconds.

During the second ion beam etching process 46, since the first protective layer 44 is formed to have overhangs 44*h* and the thickness becomes smaller as the first protective layer 44 is closer to the substrate 12 (T1>T2>T3>T4), therefore, the portion of the first electrode 22*a* and the MTJ stack structure 38*a* that is closer to the substrate 12 is exposed and etched earlier, and the portion farther away from the substrate 12 is exposed and etched later. In other words, the lower portion of the first electrode 22*a* and the lower portion of the MTJ stack structure 38*a* are trimmed to a greater extent, while the upper portion of the first electrode 22*a* and the upper portion of the MTJ stack structure 38*a* are trimmed to a lesser extent. Therefore, after the second ion beam etching process 46 is performed, the difference between the upper width and the lower width of the MTJ stack structures 38*b* remaining becomes smaller, and the difference between the upper width and the lower width of the first electrodes 22*b* becomes smaller. The MTJ stack structures 38*b* even have profiles with a sidewall that is nearly vertical. Since the minimum distance d2 between the lower widths between the adjacent first electrodes 22*b* increases (i.e., d2>d1), the problem that the first electrodes 22*b* are connected to each other due to the larger lower widths may be avoided, thus increasing the density of the MTJ devices.

During the second ion beam etching process 46, although the first protective layer 44 is still being chamfer etched, however, since the first protective layer 44 at the top corner of the second electrode 40*a* has overhangs 44*h*, therefore even if the first protective layer 44 is chamfer etched during the second ion beam etching process 46, there is still a sufficient thickness of the first protective layer 44*a* remaining to cover the top surface and the sidewall of the second electrode 40*a* to protect the second electrode 40*a* from being damaged by etching. In some embodiments, the first protective layer 44*a* remains even on the sidewall of the second electrode 40*a*.

In some embodiments, the above-mentioned processes of forming the first protective layer 44 and performing the second ion beam etching process 46 may be repeated one or more times, so that the MTJ stack structure 38*b* and the first electrodes 22*b* have the desired profiles and sizes. So far, the fabrication of multiple MTJ units 10 is completed. Each of the MTJ units 10 includes a second electrode 40*a*, an MTJ stack structure 38*b*, and a first electrode 22*b*. With the method of the embodiment of the disclosure, the difference between the lower width and the upper width of the first electrode 22*b* is reduced. However, because the second electrode 40*a* is chamfered, there is a large difference between the lower width and the upper width of the second electrode 40*a*. In some embodiments, the difference between the lower width and the upper width of the first electrode 22*b* is smaller than the difference between the lower width and the upper width of the second electrode 40*a*.

Figure 1E:
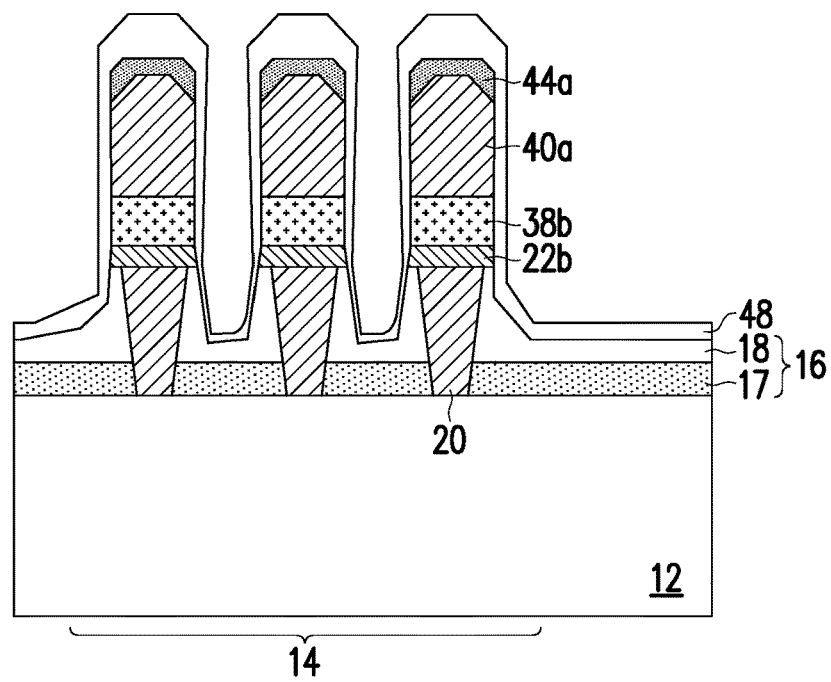

Next, referring to FIG. 1E, a second protective layer 48 is formed over the substrate 12. The second protective layer 48 covers the top surfaces and the sidewalls of the second electrodes 40*a*, the sidewalls of the MTJ stack structures 38*b*, and the first electrodes 22*b* of the MTJ units 10, but does not fill the openings OP4. The material of the second protective layer 48 includes a dielectric material, such as silicon nitride, silicon oxide, silicon oxynitride (SiON), silicon carbon oxynitride (SiCON), silicon carbide (SiC), or a combination thereof. The formation method of the second protective layer 48 is, for example, CVD or ALD. The second protective layer 48 may be a single layer or multiple layers. The thickness of the second protective layer 48 is, for example, 150 angstroms to 250 angstroms.

Figure 1F:
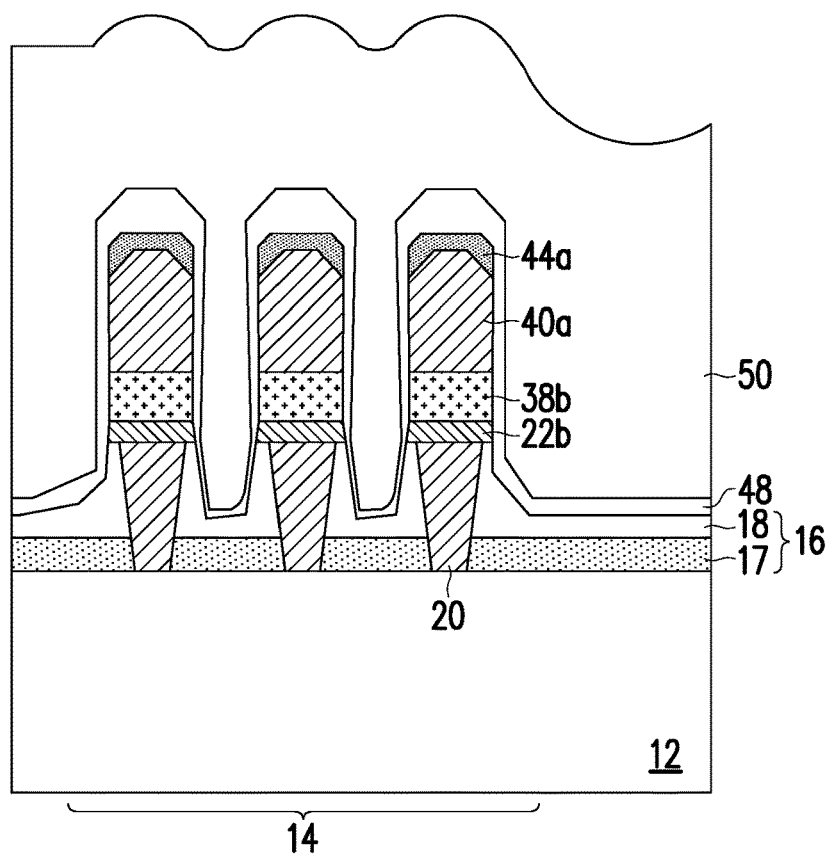

Referring to FIG. 1F, a dielectric layer 50 is formed on the second protective layer 48. The material of the dielectric layer 50 may be phosphosilicate glass, borophosphosilicate glass, or a combination thereof. The formation method of the dielectric layer 50 is, for example, spin coating, plasma enhanced chemical vapor deposition (PECVD), ALD, or a combination thereof.

Figure 1G:
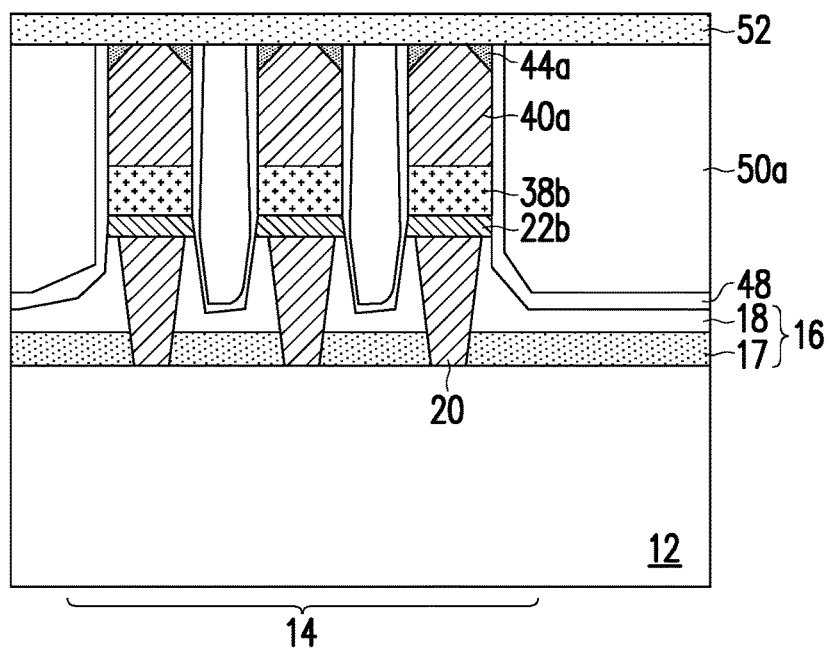

Referring to FIG. 1G, a planarization process, such as a chemical mechanical polishing process or an etch-back process, is performed on the dielectric layer 50 and the second protective layer 48 to form a dielectric layer 50*a*. In some embodiments, the top surface of the dielectric layer 50*a* is coplanar with the top surface of the second electrode 40*a*. After that, an etch stop layer 52 is formed on the dielectric layer 50*a*. The etch stop layer 52 is, for example, silicon nitride, silicon oxynitride, aluminum oxide, or a combination thereof, and the formation method is, for example, CVD.

Figure 1H:
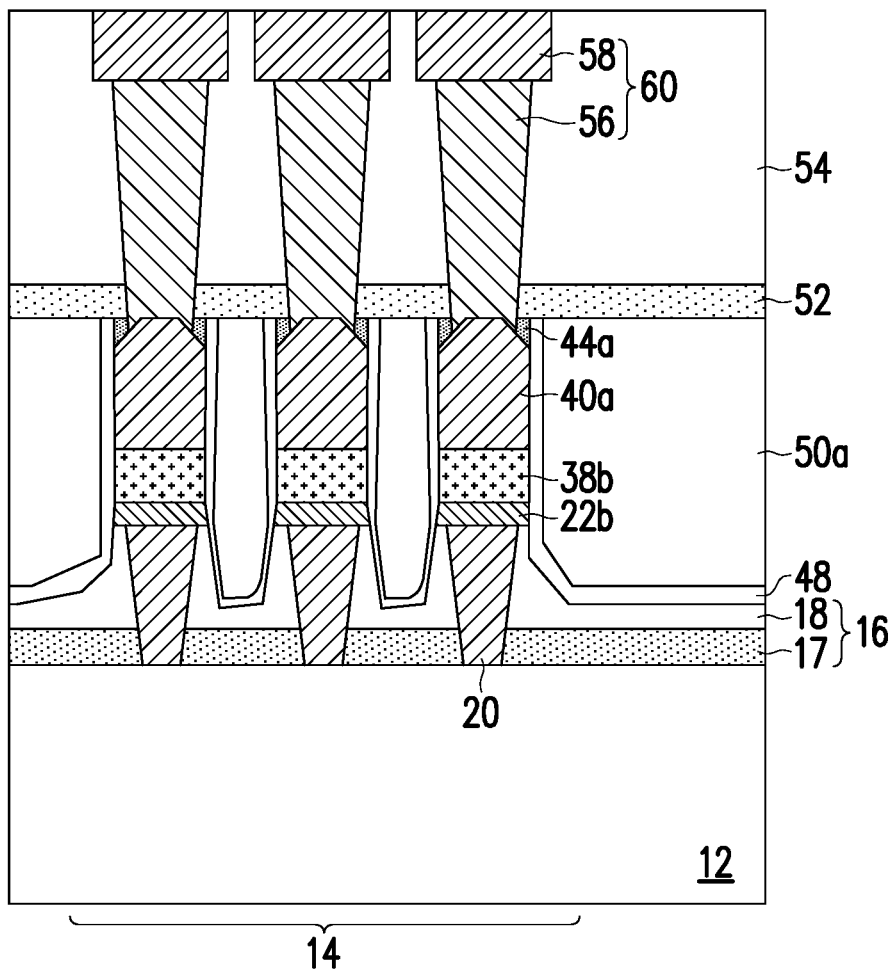

Referring to FIG. 1H, a dielectric layer 54 is formed on the etch stop layer 52, and metal interconnects 60 are formed in the dielectric layer 54. So far, the fabrication of the MTJ device is completed. The material of the dielectric layer 54 may be phosphosilicate glass, borophosphosilicate glass, or a combination thereof. The formation method of the dielectric layer 54 is, for example, spin coating, PECVD, ALD, or a combination thereof. In some embodiments, the metal interconnect 60 is, for example, a via 56 and a conductive line 58 that are electrically connected to each other. The via 56 and the conductive line 58 may be embedded in the dielectric layer 54 by a single damascene process or a dual damascene process. The metal interconnect 60 may include a barrier layer (or referred to as an adhesive layer) and a metal layer. A barrier layer (or an adhesive layer) is interposed between the dielectric layer 54 and the metal layer. The barrier layer may be selected from a group including titanium (Ti), titanium nitride (TiN), tantalum (Ta) and tantalum nitride (TaN), and the metal layer may be selected from a group including tungsten (W), copper (Cu), aluminum (Al), titanium aluminum alloy (TiAl), cobalt tungsten phosphide (CoWP), etc., but not limited thereto. Since the single damascene or dual damascene process is a well-known technique in the art, it is not repeated herein. Subsequently, other processes may also be included, which are not described herein.

To sum up, the embodiment of the disclosure utilizes two ion beam etching processes to form the MTJ device. The first ion beam etching process may preliminarily define the sizes of the second electrode, the MTJ structure, and the first electrode. The second ion beam process may fine-tune the MTJ structure and the size and profile of the first electrode. In the embodiment of the disclosure, before the second ion beam etching process is performed, a protective layer with overhangs is formed on the second electrode, which may protect the second electrode and prevent the second electrode from being damaged in the subsequent second ion beam etching process. Therefore, adopting the method of fabricating the MTJ device according to the embodiment of the disclosure may avoid abnormal connection between the MTJ device units, improve the reliability of the device, increase the accuracy of reading and writing, reduce the spacing between the MTJ devices, and reduce the wafer area occupied by the MTJ devices.

What is claimed is:

1. A method of fabricating a magnetic tunneling junction (MTJ) device, comprising:
   forming a first via in a first dielectric layer;
   forming a first electrode layer on the first dielectric layer and the first via;
   forming an MTJ stack layer on the first electrode layer;
   forming a patterned second electrode layer on the MTJ stack layer;
   using the patterned second electrode layer as a mask, performing a first ion beam etching process to etch the patterned second electrode layer and pattern the MTJ stack layer and the first electrode layer to form a second electrode, an MTJ stack structure, and a first electrode;
   forming a first protective layer to cover a top surface and a sidewall of the second electrode and a sidewall of the MTJ stack structure; and
   using the first protective layer as a mask, performing a second ion beam etching process to remove at least a portion of the MTJ stack structure and at least a portion of the first electrode,
   wherein during the second ion beam etching process, a lower portion of the first electrode and a lower portion of the MTJ stack structure are trimmed to a greater extent than an upper portion of the first electrode and an upper portion of the MTJ stack structure.

2. The method of fabricating a magnetic tunneling junction device according to claim 1, wherein the first protective layer further covers a sidewall of the first electrode and a top surface of the first dielectric layer.

3. The method of fabricating a magnetic tunneling junction device according to claim 1, wherein the first protective layer is formed to have an overhang.

4. The method of fabricating a magnetic tunneling junction device according to claim 1, wherein the first protective layer is formed so that a thickness of an upper sidewall of the second electrode is greater than a thickness of a lower sidewall of the second electrode.

5. The method of fabricating a magnetic tunneling junction device according to claim 1, wherein the first protective layer comprises a dielectric material.

6. The method of fabricating a magnetic tunneling junction device according to claim 1, wherein the first ion beam etching process and the second ion beam etching process comprise a reactive ion etching (RIE) process.

7. The method of fabricating a magnetic tunneling junction device according to claim 1, wherein a difference between a lower width and an upper width of the first electrode is smaller than a difference between a lower width and an upper width of the second electrode.

8. The method of fabricating a magnetic tunneling junction device according to claim 1, wherein when the first ion beam etching process is performed, top corners of the patterned second electrode layer are chamfered.

9. The method of fabricating a magnetic tunneling junction device according to claim 1, further comprising forming a second protective layer on the first protective layer and the first dielectric layer.

10. The method of fabricating a magnetic tunneling junction device according to claim 9, further comprising:
    forming a second dielectric layer on the second protective layer;
    planarizing the second dielectric layer;
    forming a third dielectric layer on the second dielectric layer; and
    forming a second via in the third dielectric layer, wherein the second via is electrically connected to the second electrode.

11. The method of fabricating a magnetic tunneling junction device according to claim 1, further comprising:
    repeating forming the first protective layer and performing the second ion beam etching process at least once.

* * * * *